United States Patent

Sommer et al.

Patent Number: 4,460,375
Date of Patent: Jul. 17, 1984

[54] DYEING-STABLE MONOAZO DYESTUFF, A PROCESS FOR ITS PREPARATION, AND ITS USE

[75] Inventors: Karl Sommer, Königstein; Manfred Schneider, Eppstein; Rudolf Schickfluss, Kelkheim, all of Fed. Rep. of Germany

[73] Assignee: Hoechst Aktiengesellschaft, Fed. Rep. of Germany

[21] Appl. No.: 551,271

[22] Filed: Nov. 14, 1983

[30] Foreign Application Priority Data

Nov. 16, 1982 [DE] Fed. Rep. of Germany ....... 3242309

[51] Int. Cl.³ .............................................. D06P 67/02
[52] U.S. Cl. ......................................... 8/526; 8/662; 8/696; 8/921; 8/922; 260/205; 260/208
[58] Field of Search ................................. 8/526, 662

[56] References Cited

U.S. PATENT DOCUMENTS

| | | | |
|---|---|---|---|
| 2,007,382 | 7/1935 | Ockman et al. | 8/526 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 6/1982 | Eugster et al. | 8/526 |
| 4,374,640 | 2/1983 | Tappe et al. | 8/526 |
| 4,388,078 | 6/1983 | Thomas et al. | 8/526 |

*Primary Examiner*—A. Lionel Clingman
*Attorney, Agent, or Firm*—Connolly and Hutz

[57] ABSTRACT

Figure 1:
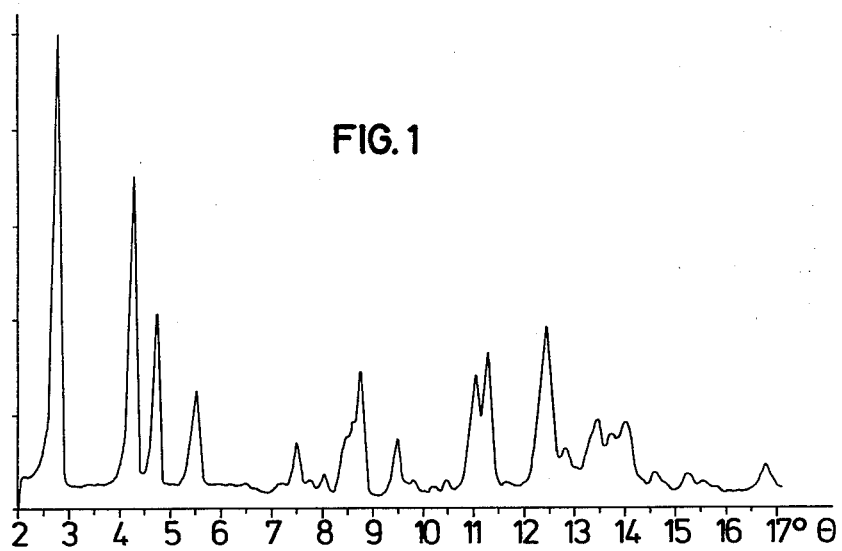

A dyeing-stable modification (β-modification) of the dyestuff of the formula (I)

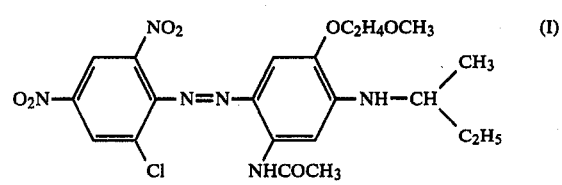

which has the X-ray diffraction diagram shown in FIG. 1 and having the characteristic reflections at the following glancing angles and relative intensities:

| [θ] | 2.74 | 4.27 | 4.70 | 5.50 | 8.74 | 11.24 | 12.44 |
|---|---|---|---|---|---|---|---|
| relative intensity | 100 | 72 | 40 | 23 | 27 | 32 | 26 | a process for its preparation by heating the dyestuff of said formula (I) of the dyeing-unstable α-modification, characterized by an X-ray diffraction diagram having the characteristic reflections at the following glancing angles and relative intensities

| [θ] | 3.55 | 4.15 | 5.35 | 9.45 | 10.41 | 12.71 | 13.89 |
|---|---|---|---|---|---|---|---|
| relative intensity | 42 | 100 | 35 | 24 | 34 | 94 | 48 | at temperatures of 60° to 120° C. in an organic solvent, and its use for dyeing fiber materials made of cellulose esters or synthetic linear polyesters.

4 Claims, 2 Drawing Figures

DYEING-STABLE MONOAZO DYESTUFF, A PROCESS FOR ITS PREPARATION, AND ITS USE

The present invention relates to a new dyeing-stable crystallographic modification ("β-modification") of the dyestuff of the formula

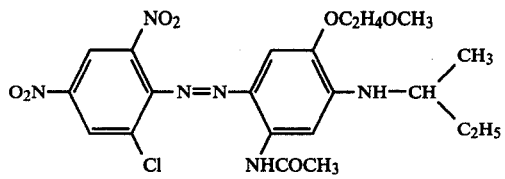

which has the X-ray diffraction diagram shown in FIG. 1 and having the characteristic reflections at the following glancing angles θ (CuK$_\alpha$ radiation) and intensities:

| [θ] | 2.74 | 4.27 | 4.70 | 5.50 | 8.74 | 11.24 | 12.44 |
|---|---|---|---|---|---|---|---|
| relative intensity | 100 | 72 | 40 | 23 | 27 | 32 | 26 |

The dyestuff of the abovementioned formula is obtained by diazotizing 6-chloro-2,4-dinitroaniline in concentrated sulfuric acid with nitrosylsulfuric acid and by coupling the resulting solution of the diazo compound with a solution of 2-isobutylamino-4-acetamino-1-methoxyethoxybenzene in dilute sulfuric acid. This reaction produces the dyeing-unstable α-modification, which is not sufficiently stable under commercial dyeing conditions. The α-modification has the X-ray diffraction diagram shown in FIG. 2 and having the characteristic reflections at the following glancing angles θ (CuK$_\alpha$ radiation) and intensities:

| [α] | 3.55 | 4.15 | 5.35 | 9.45 | 10.41 | 12.71 | 13.89 |
|---|---|---|---|---|---|---|---|
| relative intensity | 42 | 100 | 35 | 24 | 34 | 94 | 48 |

Under dyeing conditions, such as high temperature and the presence of dyeing auxiliaries, the dyeing-stable β-modification virtually does not change any more in respect of crystal size and crystal form, so that the dyeing properties and the stability of the dispersion are not impaired in the course of dyeing, in contrast to the case of the dyeing-unstable α-modification.

The new, stable β-modification is obtained by heating a suspension of the dyestuff of said α-modification in an organic solvent, such as, for example, a low molecular weight alkanol, such as, for example, methanol, ethanol, n-propanol or isopropanol, acetic acid, toluene or glycol monomethyl ether, at 60° to 120° C. for 1 to 5 hours, if appropriate under pressure. The organic solvent is advantageously used in an amount which ensures that the suspension is easily stirred.

While some dyestuffs which occur in several modifications will convert into the dyeing-stable modification on heating the dyestuff in an aqueous suspension, in the presence or absence of surfactants and organic solvents, the α-modification of the dyestuff in question could not be transformed, either by heating in an aqueous suspension or by heating a suspension in a mixture of water and organic solvent.

After its preparation, the dyeing-stable β-modification is separated from the liquid phase, for example by filtration, and is subjected to a known finishing step at the customary temperatures, i.e. at temperatures of about 20° to about 50° C., in the presence of anionic dispersants, such as, for example, alkylated naphthalenesulfonic acids, polyvinylsulfonates, condensation products of naphthalenesulfonic acid and formaldehyde or of phenol and formaldehyde, alkali metal salts of ligninsulfonates, or sulfite cellulose waste liquor, or non-ionic dispersants, such as esterified oxyalkylated novolak resins, esterified oxyalkylated aromatic hydroxy compounds, esterified block polymers of propylene oxide and ethylene oxide, or mixtures of said dispersants. The dyestuff is finely divided in customary devices, such as, for example, ball mills or sand mills.

The liquid or pulverulent preparations of the dyeing-stable β-modification thus obtained, unlike comparable preparations of the α-modification, are unrestrictedly suitable for dyeing fiber materials of cellulose esters or synthetic linear polyesters, such as polyethylene glycol terephthalate, at temperatures between 100° and 220° C. The dyeing-stable preparations do not flocculate in an aqueous medium and at high temperatures—this feature being of particular significance for the dyeing of wound packages, for example cross-wound cheeses, and give better test results in the various, generally known dyeing tests, such as the specky dyeing test, the Dan River test and the shelf life test at room temperature and at 50° C.

In the following examples, parts and percentages are by weight, unless stated otherwise.

EXAMPLE 1

100 parts of a dyestuff prepared by diazotizing 6-chloro-2,4-dinitroaniline in concentrated sulfuric acid and coupling the resulting solution of the diazo compound with a solution of 2-isobutylamino-4-acetamino-1-methoxyethoxybenzene in dilute sulfuric acid are taken after the dyestuff has been isolated and are heated in methanol at 65° C. for 3 hours. This heating takes place in such an amount of methanol as to ensure that the suspension is easily stirred. In the course of the heating, the dyeing-unstable α-modification turns into the dyeing-stable β-modification. The dyestuff is filtered off and is pearl-milled at 50° C. at most together with 20 parts of a condensation product of cresol, formaldehyde and sodium bisulfite, 120 parts of a sodium ligninsulfonate and 20 parts of an esterified ethoxylate of an alkylphenol and water until a sufficient state of fine division has been reached. Thereafter the preparation is dried in a spray unit and is standardized to the desired pure dyestuff strength with sodium ligninsulfonate. The powder thus obtained meets all dyeing requirements. If the procedure described above is repeated, except that the heating is carried out at 100° C. in n-propanol, in place of methanol, the same result is obtained.

EXAMPLE 2

100 parts of the monoazo dyestuff obtained as described in Example 1 are converted in acetic acid into the dyeing-stable β-modification by heating at 100° C. for two hours. This heating takes place in such an amount of acetic acid as to ensure an easily stirred suspension. The dyestuff is milled together with 60 parts of a condensation product of cresol, formaldehyde and sodium bisulfite, 60 parts of the sodium salt of a ligninsulfonate and 20 parts of the sodium salt of sodium diisobutylnaphthalenesulfonate, is dried and is standardized, all three steps being carried out as described in Example 1. The pulverulent preparation thus obtained meets all commercial dyeing requirements.

EXAMPLE 3

100 parts of the monoazo dyestuff obtained as described in Example 1 are heated in glycol monomethyl ether at 120° C. for 1 hour. This heating takes place in such an amount of glycol monomethyl ether as to ensure an easily stirred suspension. The dyestuff is pearl-milled at temperatures of up to 50° C. together with the dispersants listed in Example 1, and water, until sufficiently finely divided, and the mixture is then made up to a volume of 400 ml. This gives a liquid dyestuff preparation which has a dyestuff content of about 25% and satisfactory dyeing properties and good stability.

If the procedure described above is repeated, except that the heating is carried out at 111° C. in toluene, in place of glycol monomethyl ether, the same result is obtained.

We claim:

1. The dyeing-stable modification ($\beta$-modification) of the dyestuff of the formula

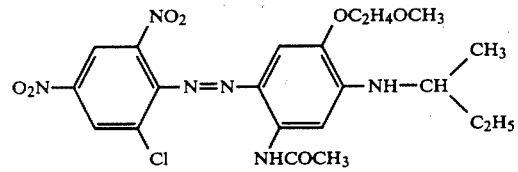

which has the X-ray diffraction diagram shown in FIG. 1 and having the characteristic reflections at the following glancing angles and relative intensities:

| [$\theta$] | 2.74 | 4.27 | 4.70 | 5.50 | 8.74 | 11.24 | 12.44 |
|---|---|---|---|---|---|---|---|
| relative intensity | 100 | 72 | 40 | 23 | 27 | 32 | 26 |

2. A process for preparing the dyeing-stable modification ($\beta$-modification) of the dyestuff of the formula

which has the X-ray diffraction diagram shown in FIG. 1 and having the characteristic reflections at the following glancing angles $\theta$ and intensities

Figure 2:
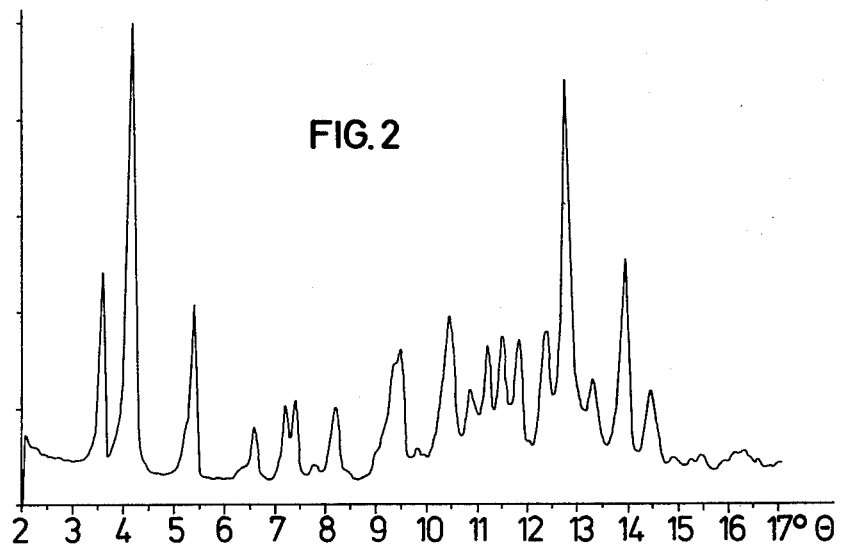

| [$\theta$] | 2.74 | 4.27 | 4.70 | 5.50 | 8.74 | 11.24 | 12.44 |
|---|---|---|---|---|---|---|---|
| relative intensity | 100 | 72 | 40 | 23 | 27 | 32 | 26 | which comprises heating the dyestuff of said formula (I) of the dyeing-unstable $\alpha$-modification, which is characterized by the X-ray diffraction diagram of FIG. 2, at temperatures of 60° to 120° C. in an organic solvent.

3. The process as claimed in claim 2, wherein the heating is carried out in a low molecular weight alkanol, acetic acid, toluene or glycol monomethyl ether as the organic solvent.

4. Process for dyeing fiber materials made of cellulose esters or synthetic linear polyesters with the dyeing-stable modification ($\beta$-modification) of claim 1.

* * * * *